United States Patent
Osgood

[19]

[11] Patent Number: 5,886,771
[45] Date of Patent: Mar. 23, 1999

[54] POLARIZING SYSTEM FOR MOTION VISUAL DEPTH EFFECTS

[75] Inventor: Alan George Osgood, Redmond, Wash.

[73] Assignee: Evergreen Innovations, L.L.C., Redmond, Wash.

[21] Appl. No.: 984,542

[22] Filed: Dec. 3, 1997

[51] Int. Cl.[6] .................................................. G03B 21/32
[52] U.S. Cl. .................. 352/43; 352/86; 353/8; 359/478
[58] Field of Search ................. 352/43, 86, 57, 352/60; 353/8, 10; 359/478

[56] References Cited

U.S. PATENT DOCUMENTS

| | | |
|---|---|---|
| 3,445,153 | 5/1969 | Marks . |
| 4,131,342 | 12/1978 | Dudlay . |
| 4,630,097 | 12/1986 | Marks . |
| 4,705,371 | 11/1987 | Beard . |
| 4,836,647 | 6/1989 | Beard . |
| 4,893,898 | 1/1990 | Beard ........................................ 352/86 |
| 4,941,041 | 7/1990 | Kenyon ..................................... 352/86 |
| 4,957,361 | 9/1990 | Shaw . |
| 5,559,632 | 9/1996 | Lawrence et al. ....................... 359/478 |
| 5,751,397 | 5/1998 | Osgood ..................................... 352/86 |

*Primary Examiner*—Russell Adams

[57] ABSTRACT

A system for creating the perception of visual depth in two dimensional single image displays. A polarizing projection filter 1c provides means to control the plane of polarization of projected imagery. The plane of polarization is changed by changing the orientation of the polarizing projection filter. An observer wears special viewing glasses 2 with polarizing filters when viewing imagery polarized by the polarizing projection filter. The plane of polarization of the polarizing viewing filter for the right eye 3 is oriented 30 degrees clockwise from horizontal. The plane of polarization of the polarizing viewing filter for the left eye 4 is oriented 30 degrees counterclockwise from horizontal. When the polarizing projection filter has an angular offset of approximately 45 degrees clockwise from horizontal the projected imagery appears approximately 20 times brighter to an observer's right eye than to the observer's left eye. Objects moving laterally 9 from right to left from the observer's perspective appear closer to the observer 10. Objects moving from left to right appear farther away from the observer. When the polarizing projection filter has an angular offset of approximately 45 degrees counterclockwise from horizontal the projected imagery appears approximately 20 times brighter to an observer's left eye than to the observer's right eye. Objects moving from right to left from the observer's perspective appear farther away from the observer. Objects moving from left to right appear closer to the observer. The imagery can be viewed in full color. The dead eye effect can be avoided by periodically changing the plane of polarization of the polarizing projection filter.

13 Claims, 5 Drawing Sheets

POLARIZING SYSTEM FOR MOTION VISUAL DEPTH EFFECTS

BACKGROUND

1. The Field of the Invention

The present invention relates to methods and apparatus for using polarizing lenses or filters to create the perception of depth when viewing laterally moving objects in two dimensional single image displays. In a further aspect, the present invention relates to the plane of polarization of polarizing filters used to produce the visual depth effects. In a still further aspect, the present invention relates to a method of controlling the movement of objects to create visual depth effects when observers wear glasses with polarizing lenses. The system is suited for motion picture films. The methods and apparatus may also be used for video displays (television, computer displays, video games, etc.) and other types of media.

2. The Prior Art

The prior art includes methods to create the perception of depth in two-dimensional motion picture films and video displays. These methods have been described in or have been the subject of various patents. The prior art often produces one or the other of the following negative side effects:

(1) Reduction or loss of the perception of color.
(2) Dead eye effect wherein observers have the sensation that one eye is not functioning properly.

One class of prior art systems uses two separate shifted images to produce visual depth effects. These systems use special eye wear that transmits one image to the left eye and the other image to the right eye. When the special eye wear is worn by an observer, differences in the relative position of objects as seen by the two eyes produces the perception of depth. Observers viewing the imagery without the special glasses see double images.

The prior art commonly uses color or polarizing filters to separate the two images. Light of the two images are polarized at right angles (90 degrees) to each other. Viewing glasses or spectacles with left and right eye polarizing filters with the plane of polarization at right angles to each other are used to transmit the image polarized in one plane to the left eye and the image polarized in the other plane to the right eye.

U.S. Pat. No. 4,957,361 to Shaw discloses using spectacles with left and right eye filters that are polarized at right angles to each other to produce the perception of depth when viewing motion pictures with double images that are polarized at right angles to each other.

U.S. Pat. No. 4,630,097 to Marks discloses using spectacles with left and right eye filters that are polarized at right angles to each other to produce the perception of depth when viewing video displays with double images that are polarized at right angles to each other.

Numerous other prior art systems use viewing glasses with lenses polarized at right angles to each other in a similar manner to transmit one image to the left eye and another image to the right eye.

Another method of creating visual depth effects is based on the Pulfrich Effect. This effect is produced by viewing moving objects which appear brighter to one eye than the other. The basic Pulfrich Effect is commonly produced by placing a dark lens or filter over one eye. Objects that move laterally in one direction appear to be farther away from the observer. Conversely, objects that move laterally in the opposite direction appear to be closer to the observer. The basic Pulfrich Effect is a uni-directional motion sensitive depth effect. The relationship between the direction of movement and the perception of depth is dependent upon which eye is covered by the dark lens. When the left eye is covered by the dark lens, objects moving left to right (from the observer's perspective) appear to be farther away. Objects moving right to left appear to be closer. When the right eye is covered by the dark lens, objects moving left to right appear to be closer. Objects moving right to left appear to be farther away.

The apparatus used to produce the basic Pulfrich Effect tends to cause an undesirable side effect. The eye covered by the dark lens receives substantially less light than the other eye. This produces the sensation that one eye is dead or not working. This dead eye effect becomes irritating to observers over time.

U.S. Pat. No. 3,445,153 to Marks is based on the basic Pulfrich Effect. Observers wear special lenses. The lens over one eye reduces the light normally received by the cones (photopic vision).

Dudley discloses in U.S. Pat. No. 4,131,342 a method of combining the basic Pulfrich Effect with a chromostereoscopic effect. The chromostercoscopic effect is based on the finding that objects of colors towards the red end of the visual spectrum appear closer than objects of colors towards the blue end of the spectrum. The chromostercoscopic effect is very weak. It also restricts the use of colors in objects and backgrounds. U.S. Pat. No. 4,131,342 teaches that the basic Pulfrich Effect is due to a "differential visual time-lag" whereby the human visual system processes a brighter image faster than a dimmer image. Therefore the location of moving objects appears to be different for the eye receiving the brighter image than for the eye receiving the dimmer image. The location of moving objects appears to be more advanced for the eye receiving the brighter image than for the eye receiving the dimmer image. This apparent eye to eye difference in the perceived location of moving objects produces the visual depth effect.

U.S. Pat. No. 4,705,371 to Beard is also based on the basic Pulfrich Effect. Observers wear another type of special lenses. The lenses are intended to reduce the dead eye effect.

U.S. Pat. No. 4,836,647 to Beard discloses alternative colored filters to produce the basic Pulfrich Effect. The colored lenses were designed to reduce the light from television displays more than the light from normal room lighting. The colored lenses were intended to reduce the "dead eye" effect.

The four methods above (U.S. Pat. Nos. 3,445,153; 4,131,342; 4,705,371; and 4,836,647) are all limited by the uni-directional nature of the motion sensitive depth effect. They are all also somewhat prone to the dead eye effect.

U.S. patent application Ser. No. 06/483,564 by Osgood teaches a means to produce a bidirectional basic Pulfrich like effect. U.S. patent application Ser. No. 06/483,564 used objects moving laterally against colored backgrounds or surrounds laterally moving colored objects, and colored viewing glasses. The left lens of the viewing glasses passes from 4 to 20 times as much light of one color (e.g. red) as the right lens. The right lens of the viewing glasses passes from 4 to 20 times as much light of another color (e.g. green). Objects moving laterally against surrounds of the first color, and laterally moving objects of the first color, appear closer to the observer when they move from left to right and farther away from the observer when they move from right to left. Objects moving laterally against surrounds of the second color, and laterally moving objects of the second color, appear closer to the observer when they move from right to left and farther away from the observer when then move from left to right.

The methods of U.S. patent application Ser. No. 06/483,564 allow each eye to receive enough light to reduce or even totally avoid the dead eye effect. However, neither eye receives the full intensity of light across the entire visual spectrum. Therefore observers may perceive a reduction in the color saturation of the images viewed. The directionality of the depth effects is dependent upon the color of the surrounds for laterally moving objects and the color of the laterally moving objects. This limits the choice of colors in the imagery. It may also lead observers to use the colors of the laterally moving objects and the colors of the surrounds for laterally moving objects to predict the direction of the visual depth effects.

BRIEF SUMMARY AND OBJECTS OF THE INVENTION

The present invention relates to methods and apparatus for using polarizing lenses to make imagery containing laterally moving objects appear brighter to either the left eye or the right eye to produce bidirectional visual depth effects.

An object of the invention is to teach methods of producing visual depth effect by using: polarizing projection filters that control the plane of polarization of projected imagery, polarizing viewing glasses, and imagery which contains lateral movement.

A second object of the invention is to provide a system of polarizing projection filters and polarizing viewing filters to produce visual depth effects when polarized imagery which contains lateral movement is observed.

A third object of the invention is to provide viewing glasses with polarizing filters of particular planes of polarization A fourth object of the invention is to provide apparatus to control the plane of polarization of projected imagery in any one of a plurality of orientations.

An additional object of the invention is to provide motion sensitive depth effects without producing a dead eye effect wherein observers have the sensation that one eye is not functioning properly.

A still further object of the invention is to provide motion sensitive depth effects without reducing the perceived color saturation of the imagery.

The system is suited for two dimensional imagery including motion pictures, video and computer displays.

BRIEF DESCRIPTION OF THE FIGURES

FIG. 4 shows that the polarizing viewing glasses do not produce visual depth effects when an observer views an image projected through a polarizing projection filter with the plane of polarization oriented horizontally.

FIG. 5 shows the visual depth effect for an observer viewing an image projected through a polarizing projection filter with the plane of polarization oriented 45 degrees clockwise from horizontal. The object in the image is moving from left to right from the observer's perspective.

FIG. 6 shows the visual depth effect for an observer viewing an image projected through a polarizing projection filter with the plane of polarization oriented 45 degrees clockwise from horizontal. The object in the image is moving from right to left.

FIG. 7 shows the visual depth effect for an observer viewing an image projected through a polarizing projection filter with the plane of polarization oriented 45 degrees counterclockwise from horizontal. The object in the image is moving from left to right.

FIG. 8 shows the visual depth effect for an observer viewing an image projected through a polarizing projection filter with the plane of polarization oriented 45 degrees counterclockwise from horizontal. The object in the image is moving from right to left.

REFERENCE NUMERALS IN FIGURES

Figure 1:
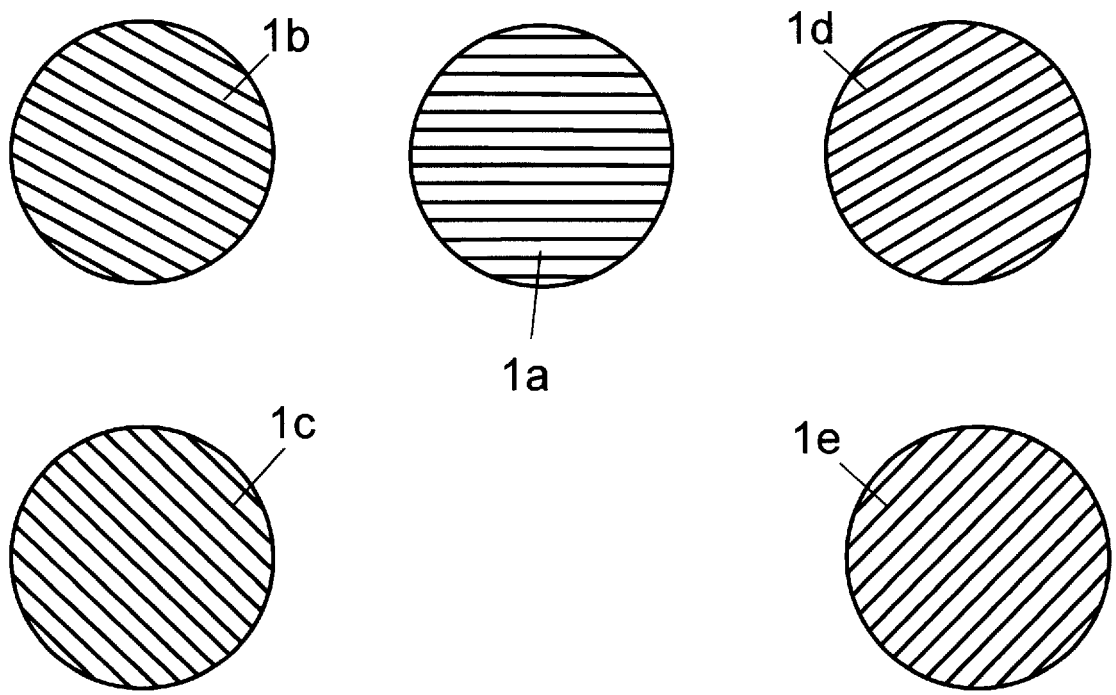
FIG. 1 shows a polarizing projection filter with its plane of polarization in five different angular orientations.

1a—Polarizing projection filter with the plane of polarization oriented horizontally 1b—Polarizing projection filter with the plane of polarization oriented 30 degrees clockwise from horizontal 1c—Polarizing projection filter with the plane of polarization oriented 45 degrees clockwise from horizontal 1d—Polarizing projection filter with the plane of polarization oriented 30 degrees counterclockwise from horizontal 1e—Polarizing projection filter with the plane of polarization oriented 45 degrees counterclockwise from horizontal 2—Polarizing viewing glasses 3—Polarizing viewing filter for the right eye with the plane of polarization oriented 30 degrees clockwise from horizontal 4—Polarizing viewing filter for the left eye with the plane of polarization oriented 30 degrees counterclockwise from horizontal 5—Light transmission with no depolarization between projection filter and viewing filters 6—Light transmission with depolarization between projection filter and viewing filters 7—Projector 8—Viewing screen 9—Current position of laterally moving object on viewing screen 9'—Earlier position of laterally moving object on viewing screen 10—Perceived position of object 9 in front of screen 11—Perceived position of object 9 behind screen 12—Neutral density filter 13—Movable frame for polarizing projection filters
14—Movie film
15—Polarizing projection filter embedded in movie film

DETAILED DESCRIPTION OF THE PREFERRED EMBODIMENTS

Summary of Invention

The preferred embodiment of the present invention uses polarizing filters to produce visual depth effects in two dimensional single image displays containing movement. The invention uses viewing glasses with filters of fixed planes of polarization. The plane of polarization of the polarizing filter for the right eye is oriented approximately 30 degrees clockwise from horizontal. The plane of polarization of the polarizing filter for the left eye is oriented approximately 30 degrees counterclockwise from horizontal. The visual imagery is projected through a polarizing projection filter. When the polarizing plane of the polarizing projection filter is horizontal, the imagery appears equally bright to both eyes of an observer observing the imagery through the viewing glasses. No visual depth effects are produced.

When the plane of polarization of the polarizing projection filter is offset clockwise from horizontal, its plane of polarization is aligned more with the plane of polarization of the polarizing viewing filter for the right eye than for the polarizing viewing filter for the left eye. Now imagery observed through the polarizing viewing glasses appears brighter to the right eye than to the left eye. This provides means whereby objects moving from right to left from the observers perspective appear closer to the observer than the display surface. Objects moving left to right appear to be farther from the observer than the display surface.

When the plane of polarization of the polarizing projection filter is offset counterclockwise from horizontal, its plane of polarization is aligned more with the plane of polarization of the polarizing viewing filter for the left eye than for the polarizing viewing filter for the right eye. Now imagery, appears brighter to the left eye than to the right eye. This provides means whereby objects moving left to right appear closer to the observer than the display surface. Objects moving right to left appear to be farther from the observer than the display surface.

The plane of polarization of the polarizing projection filter can be offset clockwise from horizontal approximately the same amount of time it is offset counterclockwise from horizontal. This balances the apparent brightness of the imagery to the left and right eyes over time. The dead eye effect can thereby be avoided. The polarizing projection filter and polarizing viewing filters allot for the full color of the imagery to be perceived by observers.

Detailed Description of Invention

Reference is now made to the drawings wherein like parts are designated with like numerals throughout.

Polarizing Projection Filter. The present invention uses polarizing projection filters in a plurality of orientations to control the plane of polarization of the light of projected imagery. A polarizing projection filter is positioned between the imagery projector and the observer. The imagery, light is projected through the polarizing projection filter. The imagery light is thereby polarized in the plane of the polarizing projection filter. FIG. 1 illustrates a polarizing projection filter in five different orientations. The polarizing projection filter is shown oriented horizontally by 1a. When the polarizing projection filter is oriented with its plane of polarization horizontal, the imagery light is polarized horizontally. When the polarizing projection filter is oriented with its plane of polarization 30 degrees clockwise from horizontal as shown by 1b the imagery light is polarized in a plane 30 degrees clockwise from horizontal. When the polarizing projection filter is oriented with its plane of polarization 45 degrees clockwise from horizontal as shown by 1c the imagery light is polarized in a plane 45 degrees clockwise from horizontal. When the polarizing projection filter is oriented with its plane of polarization 30 degrees counterclockwise from horizontal as slogan by 1d the imagery light is polarized in a plane 30 degrees counterclockwise from horizontal. When the polarizing projection filter is oriented with its plane of polarization 45 degrees counterclockwise from horizontal as shown by 1e, the imagery light is polarized in a plane 45 degrees counterclockwise from horizontal.

Figure 2:
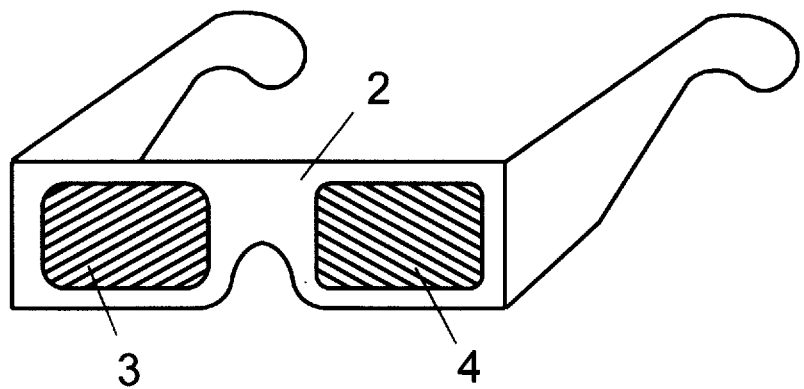
FIG. 2 is an illustration of polarizing viewing glasses with the plane of polarization of the polarizing viewing filter for the right eye oriented 30 degrees clockwise from horizontal and the plane of polarization of the polarizing viewing filter for the left eye oriented 30 degrees counterclockwise from horizontal.

Viewing Glasses and Polarizing Filters. FIG. 2 illustrates the viewing glasses 2 of the preferred embodiment. The lenses of the viewing glasses are polarizing filters. The plane of polarization is fixed for both the polarizing viewing filter for the right eye 3 and the polarizing viewing filter for the left eye 4. The plane of polarization for the polarizing viewing filter for the right eye 3 is oriented approximately 30 degrees clockwise from horizontal. The plane of polarization for the polarizing viewing filter for the left eye 4 is oriented approximately 30 degrees counterclockwise from horizontal. The difference in the orientations of the planes of polarization of the two polarizing viewing filters is approximately 60 degrees. The observer wears the polarizing viewing glasses while observing imagery projected through the polarizing projection filter.

Light Transmission by Polarizing Filters. A polarizing projection filter is used in combination with the polarizing viewing filters for left and right eyes to control the relative eye-to-eye brightness of imagery. A polarizing filter with its plane of polarization in a horizontal plane transmits essentially all of the light which vibrates in a horizontal orientation and blocks essentially all of the light which vibrates in a vertical orientation. The amount of light transmitted by one polarizing filter which is then transmitted by a second polarizing filter is determined by the angular offset between the two polarizing filters.

Figure 3:
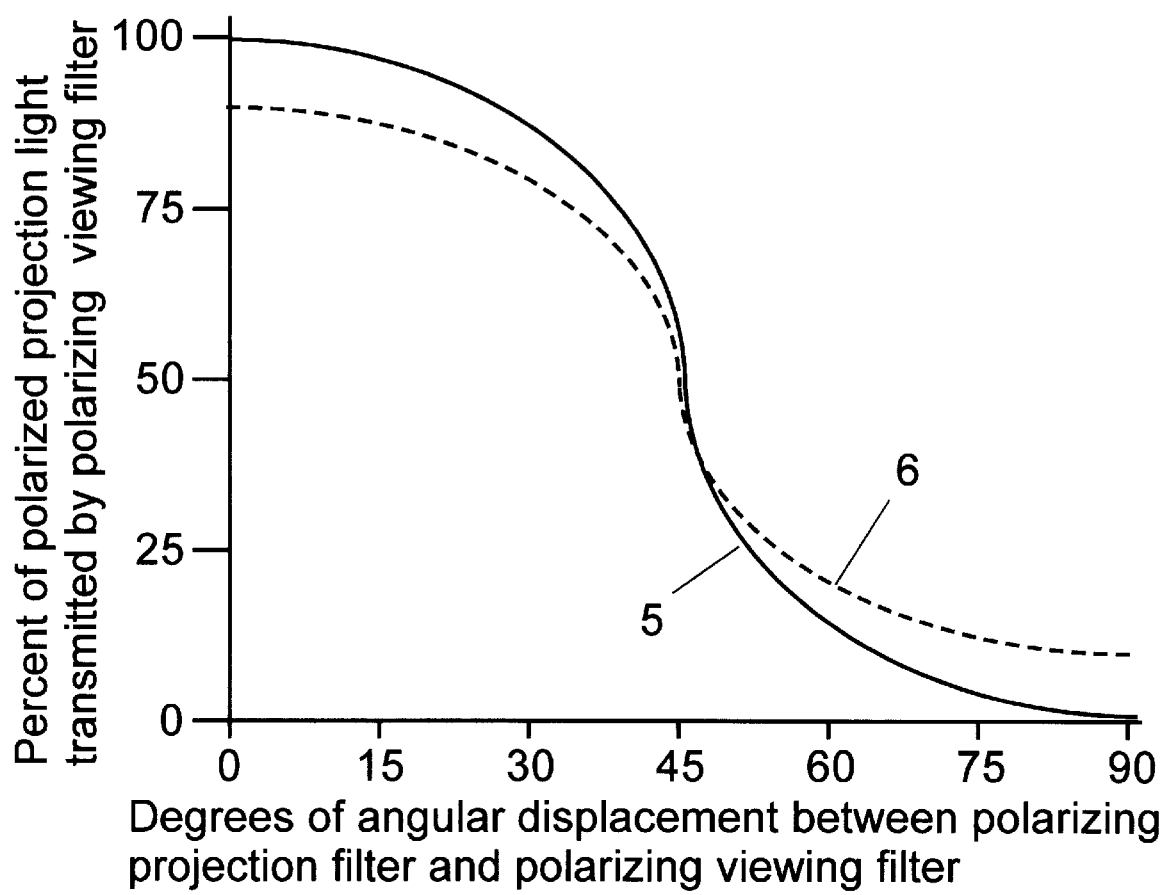
FIG. 3 illustrates the amount of light transmitted for angular offsets of from zero degrees to 90 degrees between the plane of polarization of a polarizing projection filter and the plane of polarization of a polarizing viewing filter.

FIG. 3 shows how changing the angular offset of the plane of polarization of a polarizing projector filter relative to the polarizing plane of a polarizing viewing filter changes the amount of transmitted light. The curve of light transmission 5 shows the reduction in the percentage of light transmitted as the angular offset between the plane of polarization of a polarizing projection filter and a polarizing viewing filter increases from zero degrees to 90 degrees. The shape of curve 5 is approximately sinusoidal. When the two polarizing filters are aligned (zero degrees of angular offset) nearly 100% of the light transmitted by the polarizing projector filter is transmitted through the polarizing viewing filter. When the angular offset between the two polarizing filters is 15 degrees, approximately 95% of the light transmitted by the polarizing projector filter is transmitted through the polarizing viewing filter. As the angular offset between the two polarizing filters increases to 30 degrees, the amount of light that is transmitted through the polarizing viewing filter is gradually reduced to approximately 88%. Increasing the angular offset from 30 degrees to 60 degrees results in a rapid reduction in the light transmitted from approximately 88% to approximately 12%. Increasing the angular offset from 60 degrees to 75 degrees reduces the light transmission to approximately 5%. Continuing to increase from 75 degrees to 90 degrees gradually reduces the light transmission from approximately 5% to essentially zero. Light transmission curve 5 is applicable when light passes directly from a polarizing projection filter through a polarizing viewing filter. Light transmission curve 5 is also applicable when light (a) passes through a polarizing projection filter, (b) is then reflected off a screen or surface which preserves the polarization of the light and (c) then passes through the polarizing viewing filter.

FIG. 3 also shows a curve of light transmission 6 when the light is partially depolarized after it passes through a polarizing projection filter and before it passes through a polarizing viewing filter. This occurs when the projected polarized light is reflected off a screen or surface which changes the polarization of some of the light. This is sometimes referred to as partial depolarization. Partial depolarization can occur when the projected light is reflected off some types of movie theater screens. Light transmission curve 6 shows a condition where the amount of light transmitted through the viewing polarizing filter ranges from approximately 10% to 90% of the light transmitted through the polarizing projection filter. The present invention utilizes polarizing filter orientations that take advantage of the light transmission curves 5 and 6 shown in FIG. 3.

Figure 4:
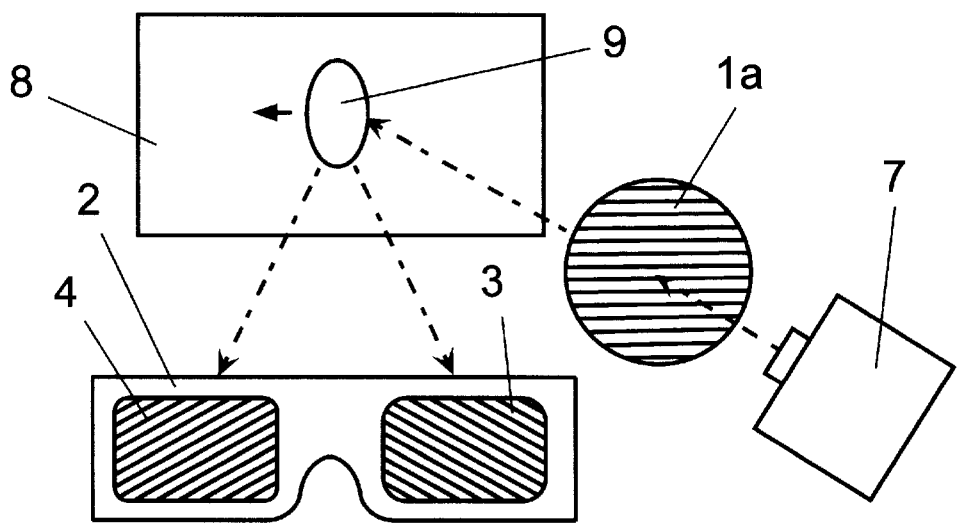
FIGS. 4 through 8 show visual depth effects manifested to an observer wearing the polarizing viewing glasses while observing images of laterally moving objects projected through a polarizing projection filter with the plane of polarization at different angular orientations.

Polarizing Projection Filter Oriented Horizontally. FIG. 4 shows a movie or video projector 7, a polarizing projection filter 1a with the plane of polarization oriented horizontally; viewing glasses 2 with a polarizing viewing filter for the right eye 3 with the plane of polarization oriented 30 degrees clockwise from horizontal, and a polarizing viewing filter for the left eye 4 with the plane of polarization oriented 30 degrees counterclockwise from horizontal, a viewing screen 8; and a laterally moving object 9. The polarizing viewing glasses 2 and the laterally moving object 9 are shown from the observer's perspective. The image of the laterally moving object 9 is projected through the polarizing projection filter 1a with the plane of polarization oriented horizontally to a viewing screen 8. The image of the laterally moving object 9 is reflected by the viewing screen towards polarizing viewing glasses 2 worn by an observer. The image of the laterally moving object 9 is transmitted through the polarizing viewing filter for the right eye 3 to the observer's right en e and through the polarizing viewing filter for the left eye 4 to the observer's left eye. The offset angle between the polarizing projection filter 1a and polarizing viewing filter for the right eye 3 is approximately 30 degrees. Likewise, the offset angle between the polarizing projection filter 1a and polarizing viewing filter for the left eye 4 is approximately 30 degrees. The plane of polarization of the projection polarizing filter is neutral relative to the plane of polarization of the polarizing viewing filter for the right eye and the plane of polarization of the polarizing viewing filter for the left eye. Approximately the same amount of light is transmitted to an observer's right eye as to an observer's left eye. The horizontally moving object 9 appears approximately equally bright to both the right eye and the left eye of the observer. In the condition shown in FIG. 4 the polarizing projection filter and the polarizing viewing filters do not produce a visual depth effect. Since the imagery appears approximately equally bright to both the left and right eyes, this condition does not contribute to the dead eye effect.

Figure 5:
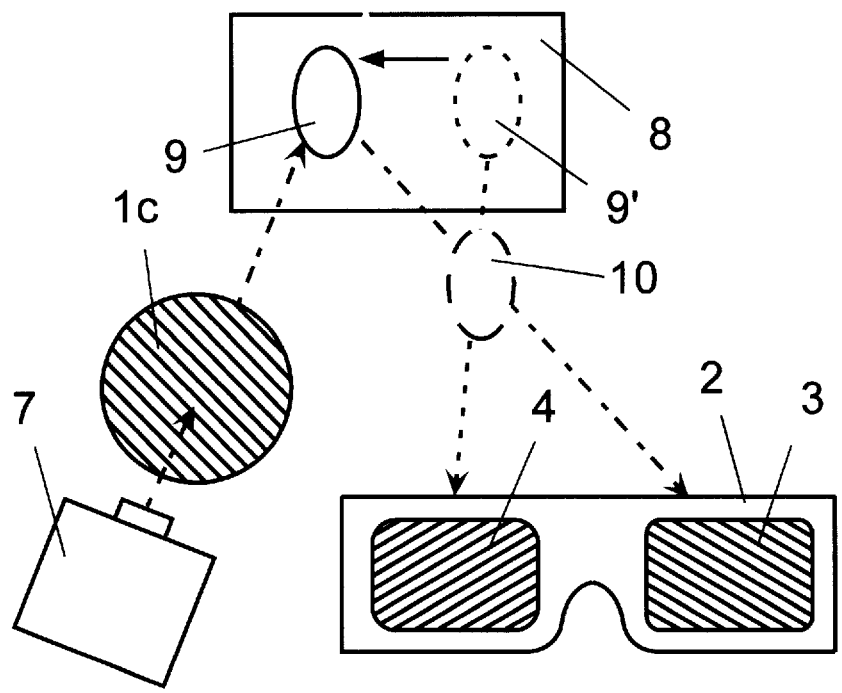

Polarizing Projection Filter Oriented Clockwise From Horizontal. FIG. 5 shows a visual depth effect produced when the polarizing plane of the projection filter 1c is oriented approximately 45 degrees clockwise from horizontal. The light from the projector 7 which is transmitted by the polarizing projection filter 1c is polarized in a plane oriented 45 degrees clockwise from horizontal. If the viewing screen does not depolarize the reflected light, all of the reflected light is in the plane oriented 45 degrees clockwise from horizontal. The polarizing viewing filter for the right eye 3 is oriented 30 degrees clockwise from horizontal. The plane of polarization of the polarizing viewing filter for the right eye has an angular offset of approximately 15 degrees from the plane of polarization of the reflected light. Light transmission curve 5 of FIG. 3 shows how much of the reflected light is transmitted by the polarizing viewing filter for the right eye. Approximately 95% of the reflected light is transmitted by the polarizing viewing filter for the right eye. The plane of polarization of the polarizing viewing filter for the left eye 4 is oriented 30 degrees counterclockwise from horizontal. The plane of polarization of the polarizing viewing filter for the left eye is offset approximately 75 degrees from the orientation of the reflected light. Approximately 5% of the reflected light is transmitted by the left eye viewing polarizing viewing filter for the left eye.

The projected imagery appears approximately 20 times brighter to the right eye than to the left eye. The laterally moving object 9 moves from right to left from the observer's perspective. The right eye sees the laterally moving object in its present position 9. The left eye sees the object in a position 9' where it was a short period of time earlier. Position 9' is to the right of position 9. The observer's visual system combines the image seen by the right eye 9 with the image seen at the same time by the left eye 9' to produce a perceived image 10. The perceived location 10 of the laterally moving object 9 is in front of the viewing screen. This produces a visual depth effect.

Figure 6:
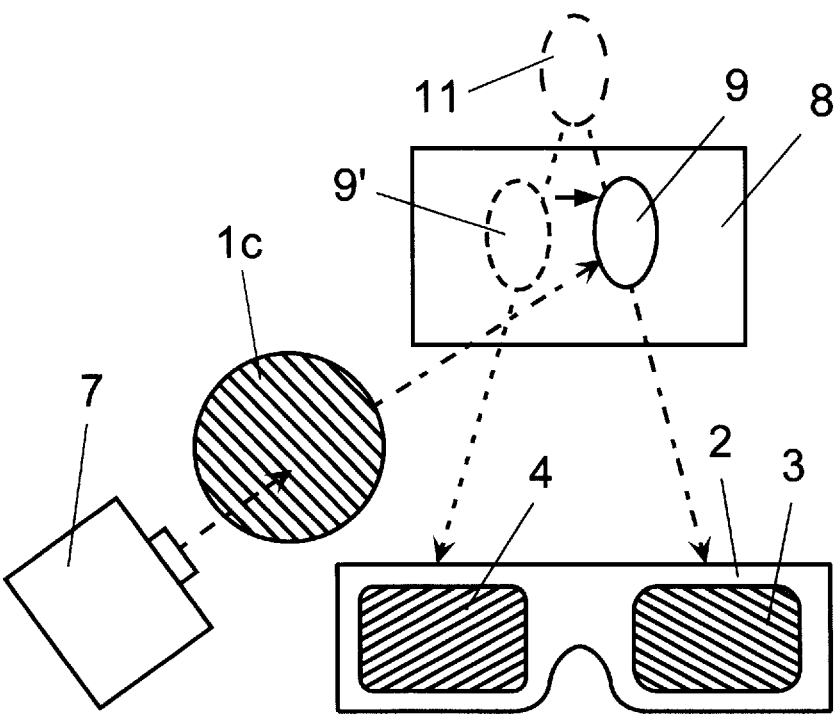

FIG. 6 shows the visual depth effect produced when the laterally moving object 9 moves from left to right. As in FIG. 5, the plane of polarization of the polarizing projection filter 1c is oriented 45 degrees clockwise from horizontal. Now the position 9' where the left eye sees the laterally moving object is to the left of the position 9 where the right eye sees the object. The laterally moving object is perceived to be at a location 11 behind the viewing screen. This produces a visual depth effect which is opposite to the effect produced in FIG. 5.

Figure 7:
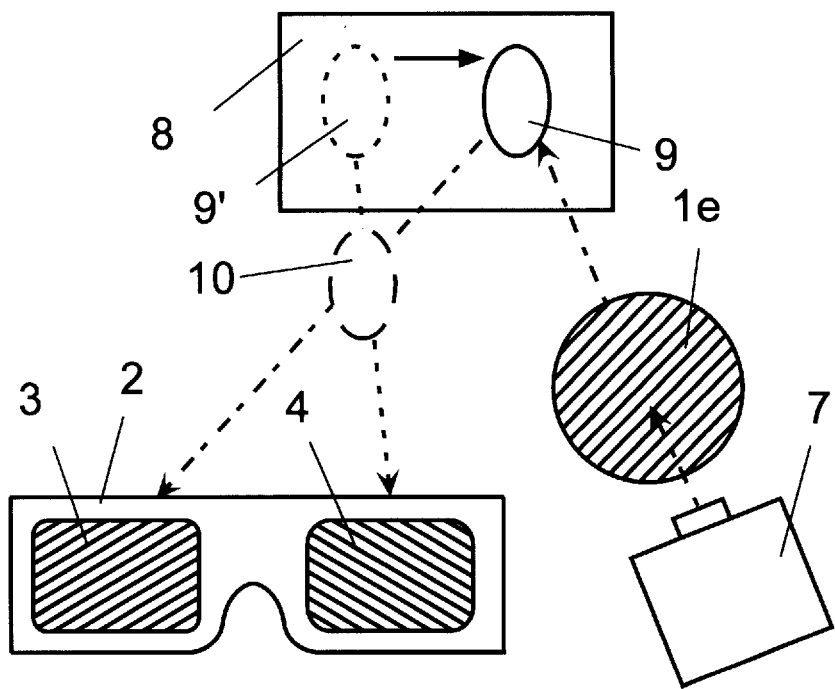

Polarizing Projection Filter Oriented Counterclockwise From Horizontal. FIG. 7 shows the visual depth effect produced when the polarizing plane of the polarizing projection filter 1e is oriented approximately 45 degrees counterclockwise from horizontal. The light from the projector 7 which is transmitted by the polarizing projection filter 1e is polarized in a plane oriented 45 degrees counterclockwise from horizontal. If the viewing screen does not depolarize the reflected light, all of the reflected light is in a plane oriented 45 degrees counterclockwise from horizontal. The polarizing viewing filter for the right eye 3 is oriented 30 degrees clockwise from horizontal. The plane of polarization of the polarizing viewing filter for the right eye is offset approximately 75 degrees from the plane of polarization of the reflected light. Light transmission curve 5 of FIG. 3 shows how much of the reflected light is transmitted by the polarizing viewing filter for the right eye. Approximately 5% of the reflected light is transmitted by the polarizing viewing filter for the right eye. The polarizing viewing filter for the left eye 4 is oriented 30 degrees counterclockwise from horizontal. The plane of polarization of the viewing filter for the left eye is offset approximately 15 degrees from the plane of polarization of the reflected light. Approximately 95% of the reflected light is transmitted by the polarizing viewing filter for the left eye.

The projected imagery appears approximately 20 times brighter to the left eye than to the right eye. The laterally moving object 9 moves from right to left from the observer's perspective. The left eye sees the laterally moving object in its present position 9. The right eye sees the object in a position 9' where it was a short period of time earlier. Position 9' is to the right of position 9. The laterally moving object is perceived to be at a location 11 behind the viewing screen. This produces a visual depth effect.

The visual depth effect produced in FIG. 7 is opposite to the effect produced in FIG. 5. Whereas in FIG. 5 an object moving laterally from right to left is perceived to be in front of the screen, in FIG. 7 an object moving laterally, from right to left is perceived to be behind the screen.

Figure 8:
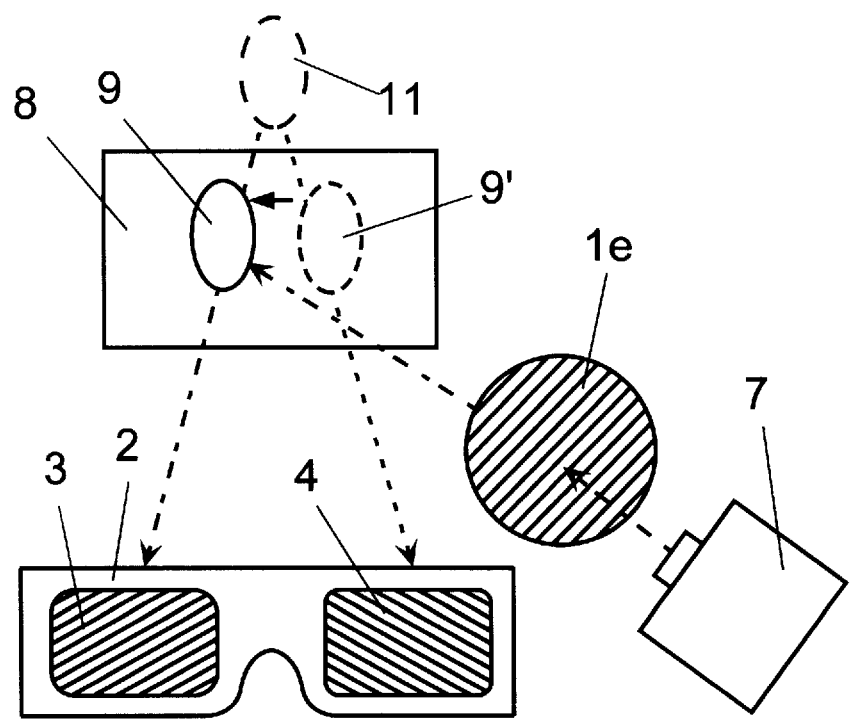

FIG. 8 shows the visual depth produced when the laterally moving object 9 moves from left to right. As in FIG. 7, the plane of polarization of the polarizing projection filter 1e is oriented 45 degrees counterclockwise from horizontal. Now the position 9' where the right eye sees the laterally moving object is to the left of the position 9 where the left eye sees the object. The laterally moving object is perceived to be at a location 10 in front of the viewing screen. This produces a visual depth effect which is the same as the effect produced in FIG. 5 and opposite to the effect produced in FIGS. 6 and 7.

FIGS. 5 and 7 shores how objects moving laterally from right to left can be made to appear either in front of or behind the viewing screen. FIGS. 6 and 8 show how objects moving laterally from left to right can be made to appear either in front of or behind the viewing screen.

Avoiding the Dead Eye Effect. The prior art systems used to produce the basic Pulfrich Effect tend to cause an undesirable side effect. The eye covered by the dark lens receives substantially less light than the other eye. This produces the sensation that one eye is dead or not working. This dead eye effect becomes irritating to observers over time. It normally takes 10 to 15 minutes for the dead eye effect to build up. The present invention provides means to avoid the dead eye effect.

When the plane of polarization of the polarizing projection filter is oriented 45 degrees clockwise from horizontal, the projected imagery appears approximately 20 times brighter to the right eye than to the left eye. This causes the dead eye effect to start to build up in the left eye. Changing the orientation of the plane of polarization of the polarizing projection filter to 45 degrees counterclockwise from horizontal reverses the relative brightness eye to eye brightness of the imagery. Now the projected imagery appears approximately 20 times brighter to the left eye than to the right eye. This breaks down the dead eye effect in the left eye and causes the dead eye effect to start to build up in the right eye. When the polarizing projection filter is oriented approximately horizontal, the projected imagery appears equally bright to both the left and right eyes. Any dead eye effect which has built up in either eye is reduced or eliminated. By limiting the time that the polarizing projection filter is oriented either 45 degrees clockwise from horizontal or 45 degrees counterclockwise from horizontal to approximately 10 minutes, the dead eye effect does not have time to build up in either eye. Thus by periodically changing the orientation of the polarizing projection filter, the dead eye effect can be avoided.

Rate of Lateral Movements. The strength of the perceived visual depth effects (how far in front of or behind the viewing screen laterally moving objects appear) is affected by the rate of lateral movement and the eye to eye brightness ratio. Prior art systems based on the basic Pulfrich Effect maintain a constant eye to eye brightness ratio. This restricts the usable range of rate of lateral movements to approximately 20 to 30 degrees of visual angle per second. (One degree of visual angle equals one inch for an object that is 57 inches away from the observer.) Slower lateral movements result in reduced visual depth effects. Faster lateral movements can result in failure of the visual system to fuse the left and right eye images. This can result in double images or the suppression of the darker image. Either way visual depth effects are not produced.

The present invention provides means to vary the eye to eye brightness ratio of the imagery. FIGS. 3 and 4 shows the polarizing plane of the projection filter 1c oriented approximately 45 degrees clockwise from horizontal. In this condition the polarizing viewing filter for the right eye 3 transmits approximately 95% of the projected light. The polarizing viewing filter for the left eye 4 transmits approximately 5% of the projected light. This results in an eye to eye brightness ratio of approximately 20-to-1. The polarizing plane of the projection filter can be oriented approximately 30 degrees clockwise from horizontal, 1b. In this condition the polarizing viewing filter for the right eye 3 transmits approximately 100% of the projected light. The polarizing viewing filter for the left eye 4 transmits approximately 12% of the projected light. This results in an eye to eye brightness ratio of approximately 8-to-1.

FIGS. 5 and 6 show the polarizing plane of the projection filter 1e oriented approximately 45 degrees counterclockwise from horizontal. In this condition the polarizing viewing filter for the left eye 4 transmits approximately 95% of the projected light. The polarizing viewing filter for the right eye 3 transmits approximately 5% of the projected light. This results in and eye to eye brightness ratio of approximately 20-to-1. The polarizing plane of the projection filter can be oriented approximately 30 degrees counterclockwise from horizontal, 1d. In this condition the polarizing viewing filter for the left eye 4 transmits approximately 100% of the projected light. The polarizing viewing filter for the right eye 3 transmits approximately 12% of the projected light. This results in an eye to eye brightness ratio of approximately 8-to-1. The tine delay for processing of the image for the eye receiving less light is less when the eye to eye brightness ratio is 8-to-1 than when the eye to eye brightness ratio is 20-to-1. The visual system can fuse left and right eye images at faster rates of lateral movements when the eye to eye brightness ratio is 8-to-1 than when the eye to eye brightness ratio is 20-to-1. Varying the angular offset of the polarizing plane of the polarizing projection filter relative to horizontal increases the range of rate of lateral movements that can be used to produce depth effects.

Depolarizing Projection Screen. The percentage of polarized projected light that is transmitted by polarizing viewing filters is reduced as the angular offset between the plane of polarization of the polarizing projection filter and a polarizing viewing filter increases from zero to 90 degrees. FIG. 3 curve 5 shows the light transmission curve when the projection screen maintains the polarization of the projected imagery. The preferred embodiment of the present invention uses a projection screen which maintains the polarization of the projected imagery. In this case the combinations of polarizing projection filter orientations and the polarizing viewing filters shown in FIGS. 5 through 8 result in eye to eye brightness ratios of approximately 20-to-1. An alternate embodiment of the present invention uses a projection screen which partially depolarizes the projected imagery. FIG. 3 curve 6 shows a light transmission curve when the projection screen partially depolarizes the projected imagery. In this case the combinations of polarizing projection filter orientations and the polarizing viewing filters shown in FIGS. 5 through 8 result in eye to eye brightness ratios of approximately 7-to-1. As the eye to eye brightness ratios are reduced below approximately 10-to-1, the strength of the visual depth effects are reduced. As long as the eye to eye brightness ratio is greater than approximately 4-to-1, visual depth effects can be produced.

Figure 9:
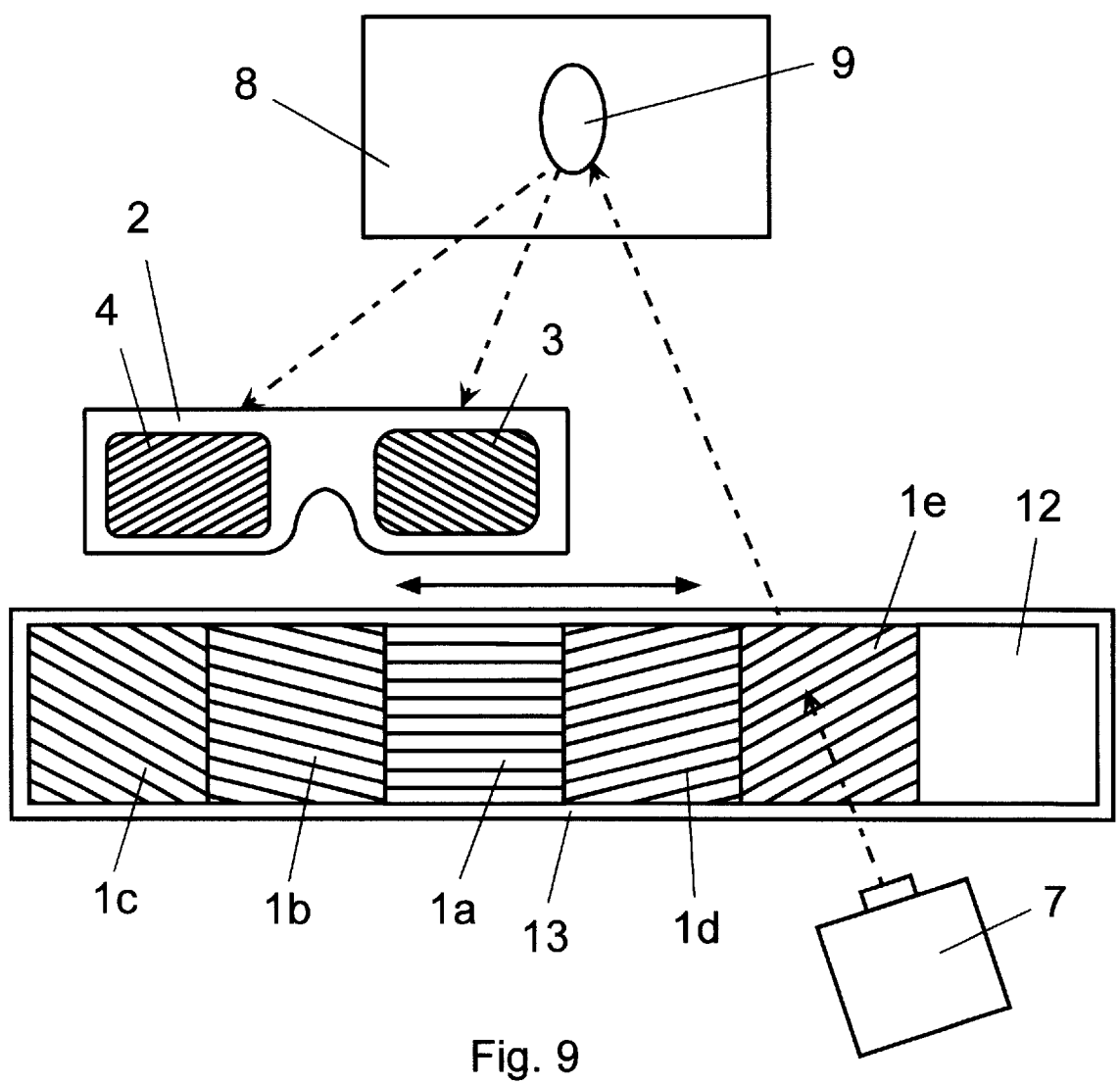
FIG. 9 shows a movable frame holding polarizing projection filters with the planes of polarization at different orientations.

Multiple Polarizing Projection Filters. The preferred embodiment as shown in FIGS. 4 through 8 uses a single polarizing projection filter positioned in different angular orientations to provide means to change the orientation of the plane of polarization of the projection imagery. Alternate means may be used to change the orientation of the plane of polarization of the projection imagery. FIG. 9 shows 5 polarizing projection filters 1a, 1b, 1c, 1d and 1e and a neutral density filter 12 mounted in a movable frame 13. Any of the 5 polarizing filters or the neutral density filter may be positioned in the beam of projected imagery. This provides means to change the plane of polarization of the projected imagery. Using multiple projection filters allows any one filter to be moved out of the projection beam before it overheats. This reduces the requirement to cool the projection filters. The polarizing filters are arranged in a horizontal row in FIG. 9. The movable frame is moved horizontally to place different filters in the projection beam. The filters could be arranged in a vertical row, a circle, or some other manner.

Electronic means such as arrays of finely spaced parallel LCD's main be used to used as polarizing projection filters. Multiple lasers of LCD's may be used to control the orientation of the plane of polarization of the projected imagery.

Controlling Plane of Polarization of Polarizing Projection Filter. In the preferred embodiment of the present invention the plane of polarization of the polarizing projection filter is controlled manually. Means can be provided to automatically control the plane of polarization of the polarizing projection filter. A signal encoded in the sound track of movie film can be used to automatically control the orientation of the polarizing plane of the projection filter. The signal can be encoded in the sound track or in other available space in video tapes and disks. Other means can be provided to control the orientation of the polarizing plane of the projection filter.

Figure 10:
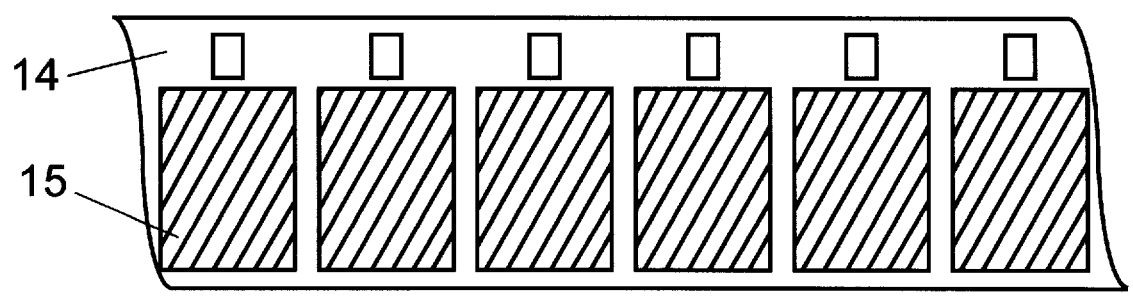
FIG. 10 shows movie film with embedded polarizing projection filters.

Polarizing Filter Embedded in Movie Film. FIG. 10 shows an alternative means to control the plane of polarization of the projected beam of imagery. The movie film 14 has polarizing filters 15 embedded in the film. Polarizing filters with different planes of polarization are embedded on different sections of the film. One section of the film is embedded with polarizing filters oriented 45 degrees clockwise from horizontal. The projected light that is transmitted by this section of film is polarized in a plane oriented 45 degrees clockwise from horizontal. This produces the same effect as the projection polarizing filter 1c oriented 45 degrees clockwise from horizontal as shows in FIGS. 5 and 6. Another section of film is embedded with polarizing filters oriented 45 degrees counterclockwise from horizontal. The projected light that is transmitted by this section of film is polarized in a plane oriented 45 degrees counterclockwise from horizontal. This produces the same effect as the projection polarizing filter 1e oriented 45 degrees counterclockwise from horizontal as shown in FIGS. 7 and 8. The polarizing filter embedded in the movie film eliminates the need for an external polarizing filter. This also eliminates the requirement for a means of rotating or moving the polarizing filter. Any standard movie projector may be used with the polarizing movie film 14 to project polarized imagery. This provides means for any standard movie projector to project imagery which when observed with the viewing glasses 2 shown in FIG. 2 creates depth effects for laterally moving objects.

Alternate Orientations of Polarizing Filters. The neutral orientation of the polarizing projection filter may be horizontal as in the preferred embodiment or in any other orientation.

In the preferred embodiment of the present invention the planes of polarization of the two polarizing viewing filters are offset approximately 60 degrees from each other. In an alternate embodiment the offset between the planes of polarization of the two polarizing viewing filters is greater than 60 degrees. This reduces the brightness of the projected imagery when the projection polarizing filter is in a neutral orientation midway between the orientations of the polarizing viewing filters for the left and right eyes.

In another alternate embodiment the offset between the planes of polarization of the two polarizing viewing filters is less than 60 degrees. This reduces the eye to eye brightness ratio that can be achieved when the plane of polarization of the projected imagery is in an orientation other than the neutral orientation. This can reduce the magnitude of the visual depth effects.

Backlighted Displays. The preferred embodiment of the present invention uses a projection screen which reflects imagery. An alternate embodiment uses backlighted displays in which the imagery is projected through the display screen. The methodology for reflective display screens is directly applicable to backlighted displays. With backlighted displays as with reflective displays, the plane of polarization of the projected polarized imagery and the plane of polarization of a polarizing viewing filter are aligned to maximize the brightness of the imagery. Offsetting the plane of polarization of the projected polarized imagery from the plane of polarization of a polarizing viewing filter reduces the brightness of the imagery.

Conclusion

The polarizing system for motion depth effects disclosed here can be used to create the perception of visual depth in two dimensional single image displays. Objects moving either laterally from right to left or laterally from left to right can be made to appear to be either closer to or farther away from an observer. The depth effects are controlled by the orientation of the polarizing planes of polarizing projection filters and polarizing viewing filters. The imagery can be viewed in full color. The dead eye effect can be avoided by periodically changing the orientation of the projection polarizing filter.

Many variations and alternate embodiments will occur to those skilled in the art. Accordingly, it is intended that the invention be limited only in terms of the appended claims.

I claim:

1. A method of using projected imagery in which some objects in the imagery are moving laterally, which when said imagery is projected through a polarizing projection filter and observed through polarizing viewing glasses, provides visual depth effects, the method comprising:

using viewing glasses comprising a light polarizing means for transmitting light to an observer's left eye and a light polarizing means for transmitting light to the observer's right eye, and the plane of polarization of said light polarizing means for the right eye having an angular offset of at least 15 degrees but not more than 75 degrees from the plane of polarization of said light polarizing means for the left eye;

orienting the plane of polarization of the polarizing projection filter with less angular offset from the plane of polarization of the light transmitting means for the left eye than to the plane of polarization of the light transmitting means for the right eye, and selecting objects which move from left to right from the observer's perspective to create the perception that the objects are closer to the observer, and selecting objects which move from right to left to create the perception that the objects are farther away from the observer;

orienting the plane of polarization of the polarizing projection filter with less angular offset from the plane of polarization of the light transmitting means for the right eye than to the plane of polarization of the light transmitting means for the left eye, and selecting objects which move from left to right from the observer's perspective to create the perception that the objects are farther away from the observer, and selecting objects which move from right to left to create the perception that the objects are closer to the observer.

2. The method of claim 1 wherein the plane of polarization of the light polarizing means for the right eye having an angular offset of at least 30 degrees but not more than 75 degrees from the plane of polarization of the light polarizing means for the left eye.

3. The system of claim 1 wherein the plane of polarization of the light polarizing means for the right eye having an angular offset of at least 45 degrees but not more than 75 degrees from the plane of polarization of the light polarizing means for the left eye.

4. A system for creating visual depth effects when observing projected imagery in which at least some objects in the imagery exhibit a lateral movement, comprising:

an apparatus for projecting imagery;

an apparatus for polarizing the light of said projected imagery, said light polarizing apparatus provides means for orienting the plane of polarization of the projected images in a plurality of orientations;

viewing glasses for observing said imagery, said viewing glasses comprising:

first means for transmitting the imagery to an observer's right eye said first light transmitting means being a polarizing filter with a first plane of polarization;

second means for transmitting the imagery to the observer's left eye, said second light transmitting means being a polarizing filter with a second plane of polarization;

the plane of polarization of the second light transmitting means of the viewing glasses having an angular offset at least 15 degrees but not more than 75 degrees from the plane of polarization of the first light transmitting means of the viewing glasses;

means for holding said first and second light transmitting means in place on an observer's face in front of his or her respective eyes.

5. The system of claim 4 wherein the plane of polarization of the second light transmitting means of the viewing glasses having an angular offset at least 30 degrees but not more than 75 degrees from the plane of polarization of the first light transmitting means of the viewing glasses.

6. The system of claim 4 wherein the plane of polarization of the second light transmitting means of the viewing glasses having an angular offset at least 45 degrees but not more than 75 degrees from the plane of polarization of the first light transmitting means of the viewing glasses.

7. Viewing glasses for creating visual depth effects when observing polarized imagery, said viewing glasses comprising:

first means for transmitting the imagery to an observer's right eye, said first light transmitting means being a polarizing filter with a plane of polarization in a first orientation;

second means for transmitting the imagery to the observer's left eye said second light transmitting means being a polarizing filter with a plane of polarization in a second orientation;

the plane of polarization of the second light transmitting means having an angular offset at least 15 degrees but not more than 75 degrees from the plane of polarization of the first light transmitting means;

means for holding the first and second light transmitting means in place on an observer's face in front of his or her respective eyes.

8. Said viewing glasses of claim 7 wherein the plane of polarization of the second light transmitting means having an angular offset at least 30 degrees but not more than 75 degrees from the plane of polarization of the first light transmitting means.

9. The viewing glasses of claim 7 wherein the plane of polarization of the second light transmitting means having an angular offset at least 45 degrees but not more than 75 degrees from the plane of polarization of the first light transmitting means.

10. An apparatus for polarizing the light of projected imagery for creating visual depth effects when said projected imagery is observed with polarizing glasses, said light polarizing apparatus provides means for orienting the plane of polarization of said projected imagery in any one of a plurality of orientations.

11. The light polarizing apparatus of claim 10 wherein the light polarizing apparatus provides means for orienting the plane of polarization of projected imagery in any one of three or more orientations.

12. The light polarizing apparatus of claim 10 wherein the light polarizing apparatus provides means for orienting the plane of polarization of projected imagery in any one of a plurality of orientations or of not polarizing the projected light.

13. The light polarizing apparatus of claim 10 wherein the light polarizing apparatus provides means for orienting the plane of polarization of projected imagery in any one of three or more orientations or of not polarizing the projected light.

* * * * *

UNITED STATES PATENT AND TRADEMARK OFFICE
CERTIFICATE OF CORRECTION

PATENT NO. : 5,886,771
DATED : March 23, 1999
INVENTOR(S) : Alan George Osgood

It is certified that error appears in the above-identified patent and that said Letters Patent is hereby corrected as shown below:

FIG. 7, reference numeral for the polarizing viewing filter for the right eye, change '4' to --3--.

FIG. 7, reference numeral for the polarizing viewing filter for the left eye, change '3' to --4--.

FIG. 8, reference numeral for the polarizing viewing filter for the right eye, change '4' to --3--.

FIG. 8, reference numeral for the polarizing viewing filter for the left eye, change '3' to --4--.

Abstract figure, reference numeral for the polarizing viewing filter for the right eye, change '4' to --3--.

Abstract figure, reference numeral for the polarizing viewing filter for the left eye, change '3' to --4--.

Col. 2, line 23, change 'chromostercoscopic' to --chromostereoscopic--.

Col. 2, line 26, change 'chromostercoscopic' to --chromostereoscopic--.

Col. 5, line 51, change 'allot' to --allow--.

Col. 6, line 11, change 'slogan' to --shown

Col. 7, line 43, change 'en e to --eye--.

Col. 9, line 26, change 'shores to --show--.

Col. 10, line 42, change 'tine to --time--.

UNITED STATES PATENT AND TRADEMARK OFFICE
CERTIFICATE OF CORRECTION

PATENT NO. : 5,886,771
DATED : March 23, 1999
INVENTOR(S) : Alan George Osgood

It is certified that error appears in the above-identified patent and that said Letters Patent is hereby corrected as shown below:

Col. 11, line 32, change 'lasers to --layers--.

Signed and Sealed this

Thirtieth Day of November, 1999

Attest:

Q. TODD DICKINSON

Attesting Officer

Acting Commissioner of Patents and Trademarks